US006587902B1

(12) United States Patent
Lin

(10) Patent No.: US 6,587,902 B1
(45) Date of Patent: Jul. 1, 2003

(54) I/O PORT ASSEMBLY OF NOTEBOOK COMPUTER CONNECTABLE TO MONITOR OR TV AS NEEDED

(75) Inventor: Mark Lin, Taipei (TW)

(73) Assignee: Inventec Corporation, Taipei (TW)

( * ) Notice: Subject to any disclaimer, the term of this patent is extended or adjusted under 35 U.S.C. 154(b) by 33 days.

(21) Appl. No.: 10/026,648

(22) Filed: Dec. 27, 2001

(51) Int. Cl.[7] .................................................. G06F 13/00

(52) U.S. Cl. ........................ 710/100; 710/300; 710/105; 710/106; 345/603

(58) Field of Search ................................. 710/100, 303; 725/148; 375/240.01; 345/589, 603, 213, 686

(56) References Cited

U.S. PATENT DOCUMENTS

| | | | | |
|---|---|---|---|---|
| 5,355,443 A | * | 10/1994 | Kim et al. | 345/589 |
| 5,608,423 A | * | 3/1997 | Leach | 345/686 |
| 6,160,543 A | * | 12/2000 | Chen | 345/213 |
| 6,178,474 B1 | * | 1/2001 | Hamano et al. | 710/303 |
| 6,184,919 B1 | * | 2/2001 | Asprey et al. | 725/148 |
| 2002/0106018 A1 | * | 8/2002 | D'Luna et al. | 375/240.01 |
| 2002/0149541 A1 | * | 10/2002 | Shin | 345/3.1 |

* cited by examiner

*Primary Examiner*—Sumati Lefkowitz
*Assistant Examiner*—Christopher E. Lee

(57) ABSTRACT

The invention provides an input/output (I/O) port assembly of a notebook computer connectable to a monitor or a television (TV), which comprises an image processor, an I/O port, and a signal transmission circuit interconnected between the image processor and the I/O port. When I/O port of the computer is coupled to monitor or TV, signal transmission circuit generates different signal voltage states. As such, image processor can output a correct signal to the coupled monitor or TV based on a change of the signal voltage states. With this, the computer is connectable to monitor or TV via a single I/O port and an adapter connected between the I/O port and monitor or TV.

10 Claims, 7 Drawing Sheets

I/O PORT ASSEMBLY OF NOTEBOOK COMPUTER CONNECTABLE TO MONITOR OR TV AS NEEDED

FIELD OF THE INVENTION

The present invention relates to notebook computer and more particularly to an I/O port assembly of notebook computer connectable to either monitor or TV as needed.

BACKGROUND OF THE INVENTION

Conventionally, a notebook computer is equipped with two pairs of display interface and input/output (I/O) port connectable to monitor and TV respectively as shown in FIG. 1. It is also understood that the case of using monitor and TV at the same time is rare. This means that one pair of display interface and I/O port is generally unused almost all the time. Such convenient design eventually turns out to be a waste. This is disadvantageous. Further, information technologies have known a rapid and a spectacular development leading to an increasing use of notebook computer. Recently, there is a trend of developing compact and slim notebook computers among computer manufacturers. Hence, the above two pairs of display interface and I/O port occupied more precious space contradicts the trend. However, in fact one pair of display interface and I/O port does not satisfy all users. To the worse, it may cause inconvenience to users. Hence, the provision of a single pair of display interface and I/O port is not desirable for manufacturers. Moreover, it is contemplated that the provision of two pairs of display interface and I/O port is to tailor respective needs of monitor and TV users. As such, it is possible of losing some consumers if there is only one pair of display interface and I/O port provided on notebook computer. This is also not desirable for manufacturers. In another point of view, it is a difficult decision for manufacturers to choose one pair of display interface and I/O port which is connectable to either monitor or TV always.

Thus, it is desirable to provide a novel I/O port assembly of notebook computer capable of connecting to monitor or TV in order to overcome the above drawbacks of prior art.

SUMMARY OF THE INVENTION

It is therefore an object of the present invention to provide an input/output (I/O) port assembly of a notebook computer connectable to a monitor or a television (TV) as needed. The I/O port assembly comprises an image processor, an I/O port, and a signal transmission circuit interconnected between the image processor and the I/O port. When I/O port of the computer is coupled to monitor or TV, signal transmission circuit generates different signal voltage states. As such, image processor can output a correct signal to the coupled monitor or TV based on a change of the signal voltage states. With this, the computer is connectable to monitor or TV via a single I/O port and an adapter connected between the I/O port and monitor or TV.

The above and other objects, features and advantages of the present invention will become apparent from the following detailed description taken with the accompanying drawings.

DETAILED DESCRIPTION OF THE PREFERRED EMBODIMENTS

Figure 1:
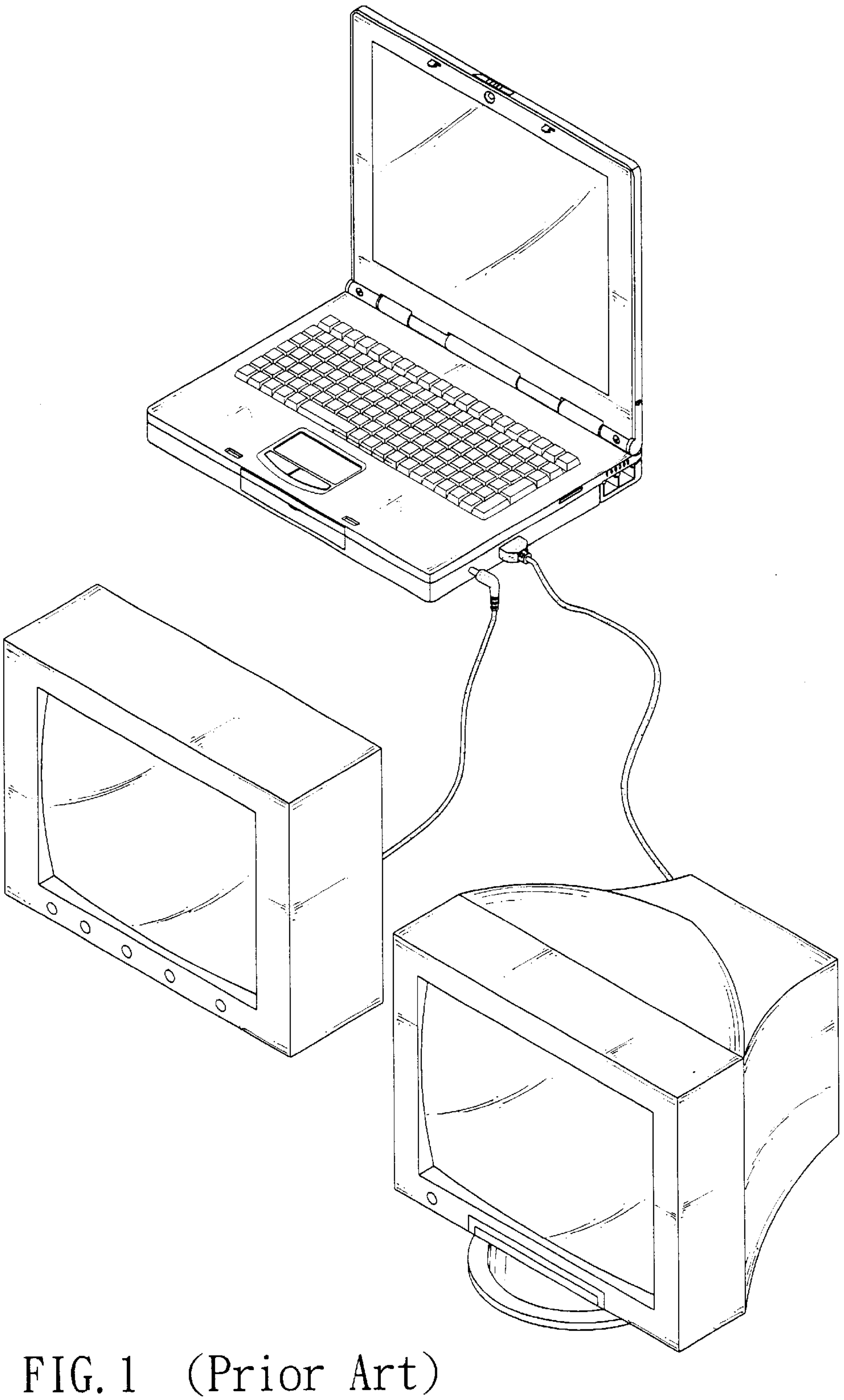
FIG. 1 (Prior Art)
FIG. 1 presents schematically the connection of notebook computer to both monitor and TV according to prior art.
Figure 2:
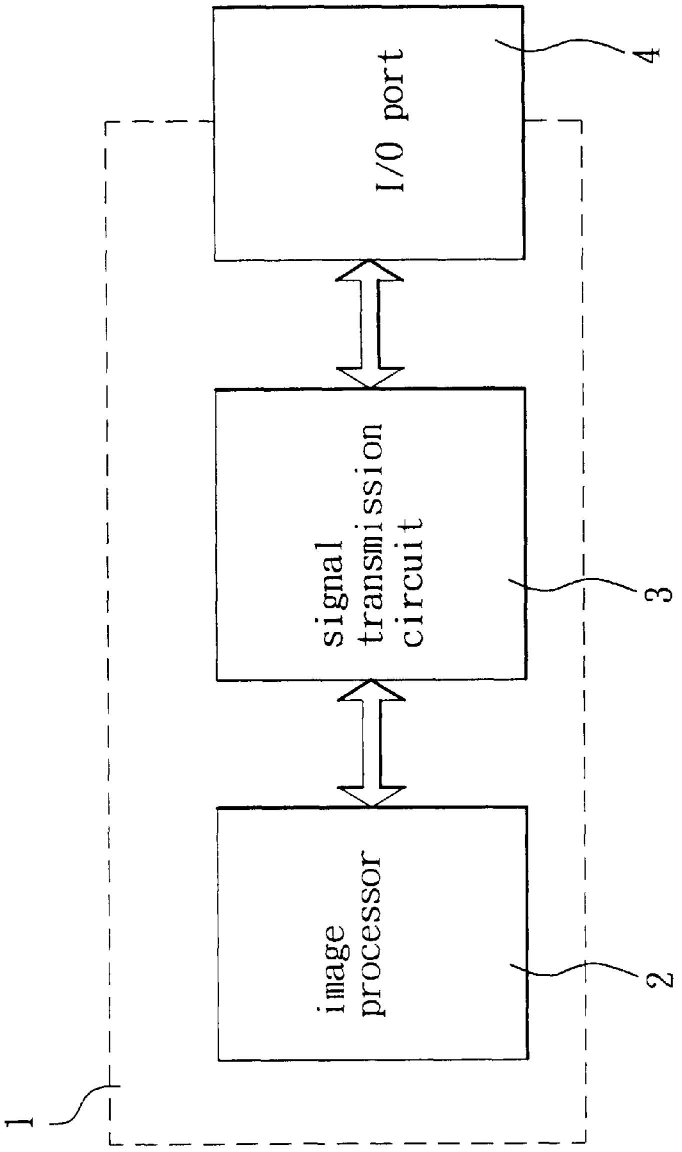
FIG. 2 is a block diagram showing a connection of I/O port assembly in notebook computer according to the invention.
Figure 3:
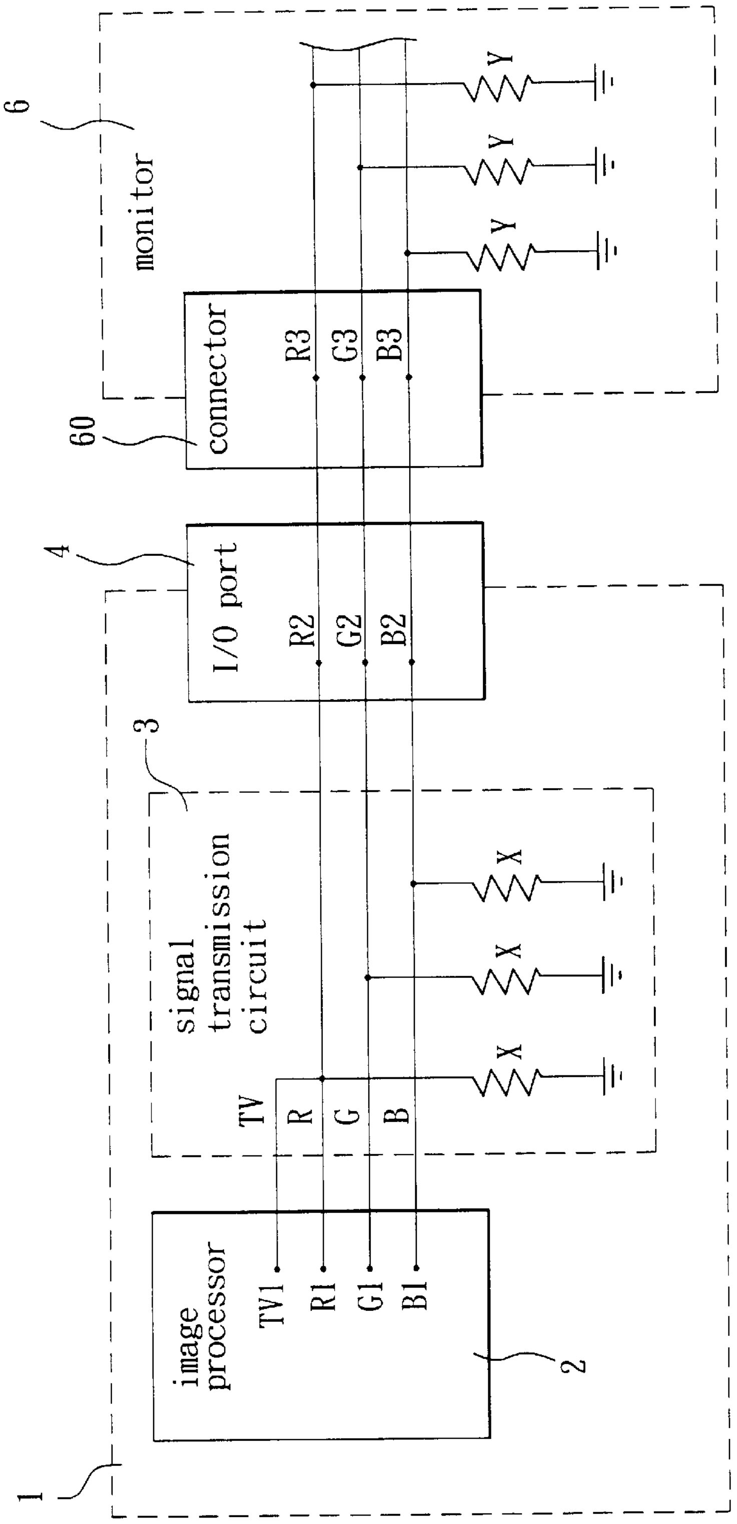
FIG. 3 is a block diagram showing a connection of I/O port assembly to other components of notebook computer and a monitor of computer according to a first preferred embodiment the invention.
Figure 4:
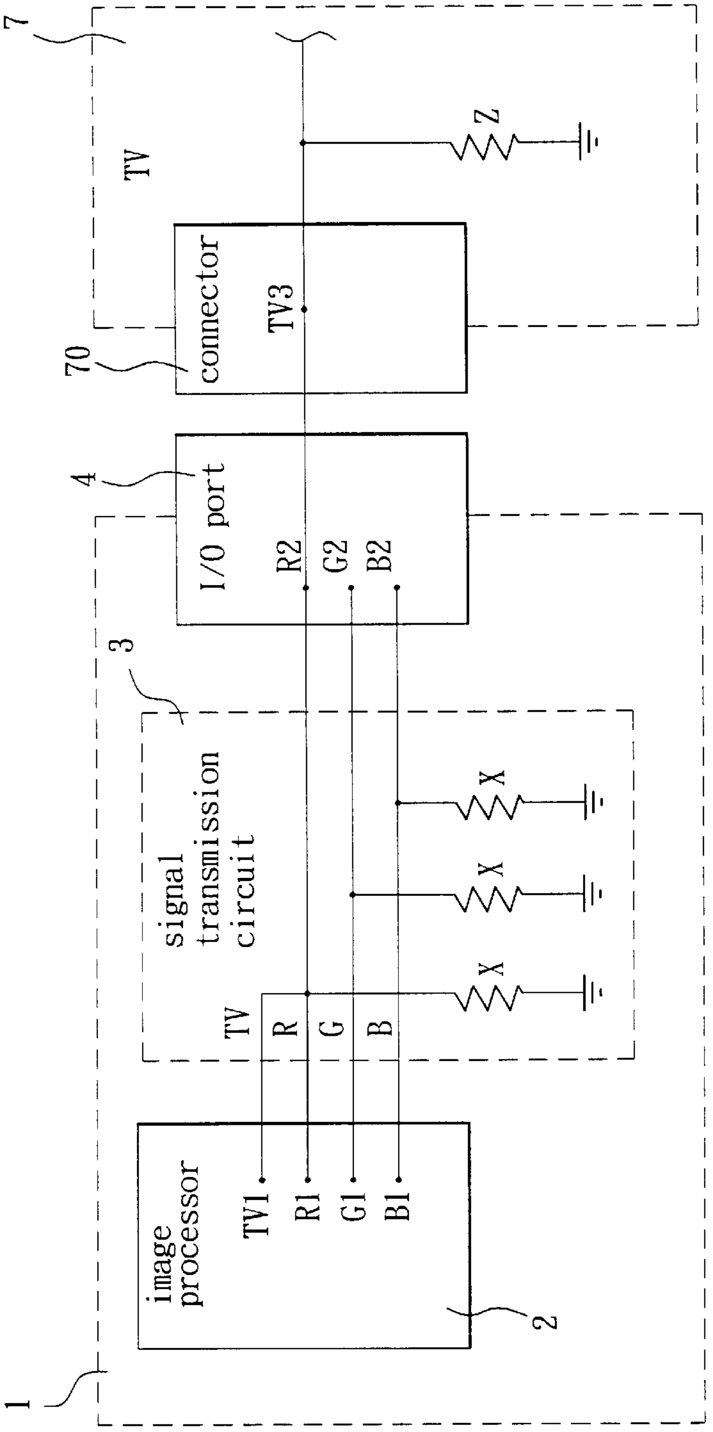
FIG. 4 is a block diagram showing a connection of I/O port assembly to other components of notebook computer and a TV according to a second preferred embodiment the invention.

Referring to FIGS. 2 to 4, there is shown an I/O port assembly of notebook computer capable of connecting to monitor or TV in accordance with the invention. The I/O port assembly comprises a signal transmission circuit 3 coupled to an image processor 2 in notebook computer 1 and an I/O port 4 on the case of notebook computer 1 respectively. When I/O port 4 is coupled to connector 60 of monitor 6 (as shown in FIG. 3) or connector 70 of TV 7(as shown in FIG. 4), signal transmission circuit 3 generates different signal voltage states. As such, image processor 2 may output a correct display signal based on the states as well as send the display signal to I/O port 4 via signal transmission circuit 3. With this, notebook computer 1 is capable of coupling to monitor 6 or TV 7 via a single I/O port 4.

In the invention, as referring to FIG. 3, there are provided a plurality of contacts on image processor 2 including a composite signal contact TV1, a red video signal contact R1, a green video signal contact G1, and a blue video signal contact B1. Also, there are provided a plurality of contacts on I/O port 4 including a red video signal contact R2, a green video signal contact G2, and a blue video signal contact B2. Further, there are provided a plurality of lines on signal transmission circuit 3 including a composite signal line TV, a red video signal line R, a green video signal line G, and a blue video signal line B. Since I/O port 4 and image processor 2 are well known. Thus a detailed description thereof is omitted herein for the sake of brevity.

It is contemplated by the invention that signal transmission circuit 3 may be coupled to both I/O port 4 and image processor 2 by one of a variety of connections. One of such connections is to effect a signal communication between image processor 2 and I/O port 4 via signal transmission circuit 3 either directly or indirectly. Following are two preferred embodiments according to the invention wherein an indirect embodiment is detailed below.

As shown in FIGS. 3 and 4, one ends of red video signal line R, green video signal line G, and blue video signal line B are coupled to red video signal contact R1, green video signal contact G1, and blue video signal contact B1 of image processor 2 respectively and the other ends thereof are coupled to red video signal contact R2, green video signal contact G2, and blue video signal contact B2 of I/O port 4 respectively. Each of red video signal line R, green video signal line G, and blue video signal line B is coupled to a selected resistor X having a predetermined resistance which is in turn connected to ground. One end of composite signal line TV is coupled to composite signal contact TV1 of image processor 2 and the other end thereof is coupled to red video signal line R, green video signal line G, or green video signal line G. In the embodiment, composite signal line TV is coupled to red video signal line R.

In FIG. 3, I/O port 4 of notebook computer 1 is connectable to a connector 60 of monitor 6. Connector 60 of monitor 6 comprises a red video signal pin R3, a green video signal pin G3, and a blue video signal pin B3 coupled to red video signal contact R2, green video signal contact G2, and blue video signal contact B2 respectively. Each of pins R3, G3, and B3 is coupled to a selected resistor Y having a predetermined resistance which is in turn connected to ground. When connector 60 of monitor 6 is connected to I/O port 4, image processor 2 performs the following steps:

First, resistors Y and resistors X are connected in parallel to form a resistor having a smaller resistance. Next, image processor 2 continuously output a constant current. Hence, image processor 2 may detect that there is a change of signal voltage in each of red video signal line R, green video signal line G, and blue video signal line B (e.g., small voltage change). Since there is a change of signal voltage in each of red video signal line R, green video signal line G. and blue video signal line B, signal output is disabled in composite signal contact TV1. Also, composite signal line TV is in a high impedance state. Hence, red video signal contact R1, green video signal contact G1, blue video signal contact B1 may output signal to the connected monitor 6 via red video signal line R, green video signal line G, blue video signal line B, and I/O port 4.

In FIG. 4, I/O port 4 of notebook computer 1 is connectable to a connector 70 of TV 7. Connector 70 of TV 7 comprises a composite signal pin TV3 coupled to a selected resistor Z having a predetermined resistance which is in turn connected to ground. When connector 70 of TV 7 is connected to I/O port 4, image processor 2 performs the following steps:

First, resistor Z and resistors X are connected in parallel to form a resistor having a smaller resistance. Next, image processor 2 continuously output a constant current. Hence, image processor 2 may detect that there is only a change of signal voltage in red video signal line R. Since there is a change of signal voltage in red video signal line R, signal output is disabled in red video signal contact R1, green video signal contact G1, and blue video signal contact B1. Also, each of red video signal line R, green video signal line G, and blue video signal line B is in a high impedance state. Hence, signal may be outputted from composite signal contact TV1 to TV 7 via red video signal line R and I/O port 4.

Figure 5:
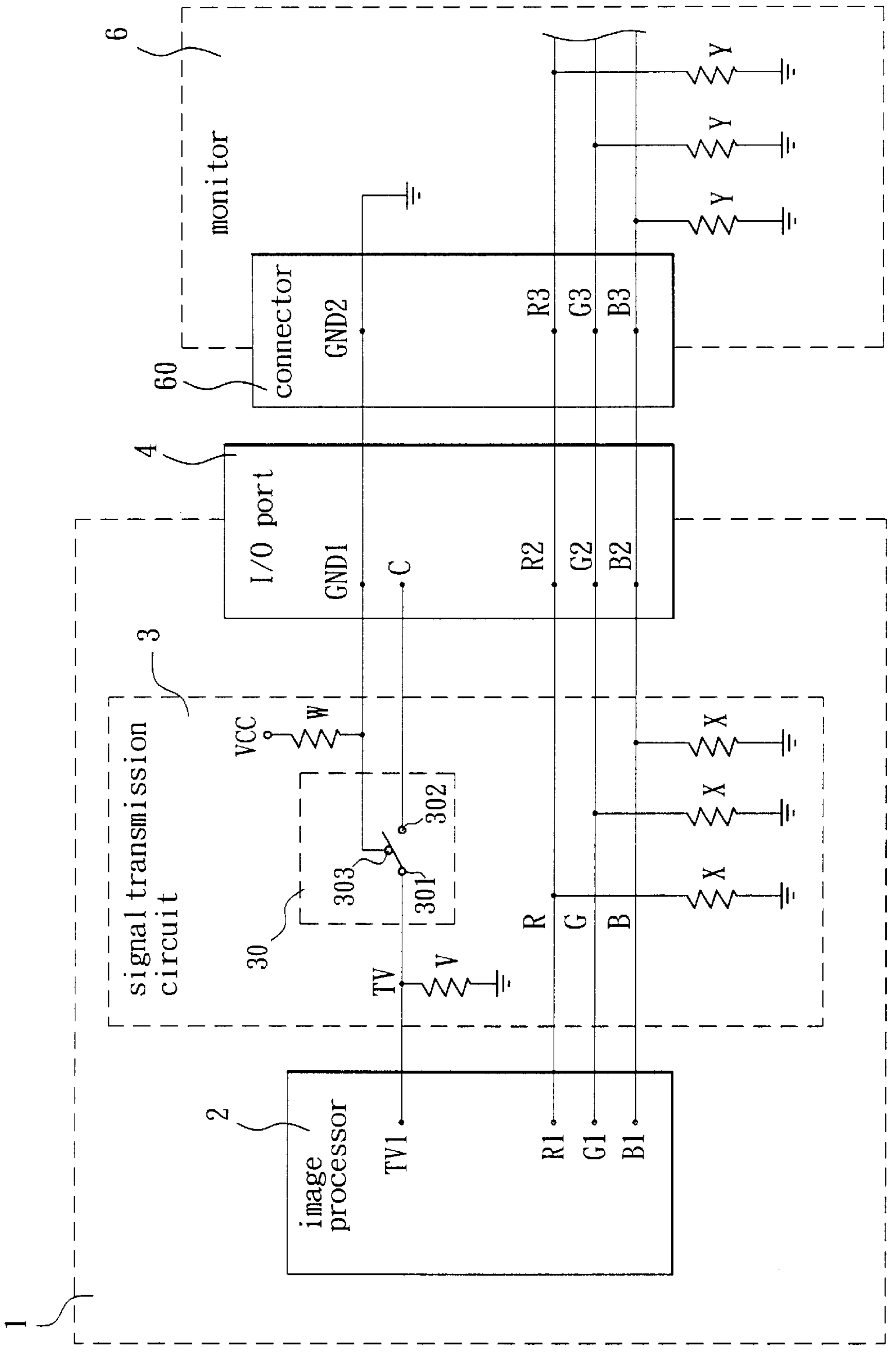
FIG. 5 is similar to FIG. 3 showing a variation of FIG. 3 embodiment.
Figure 6:
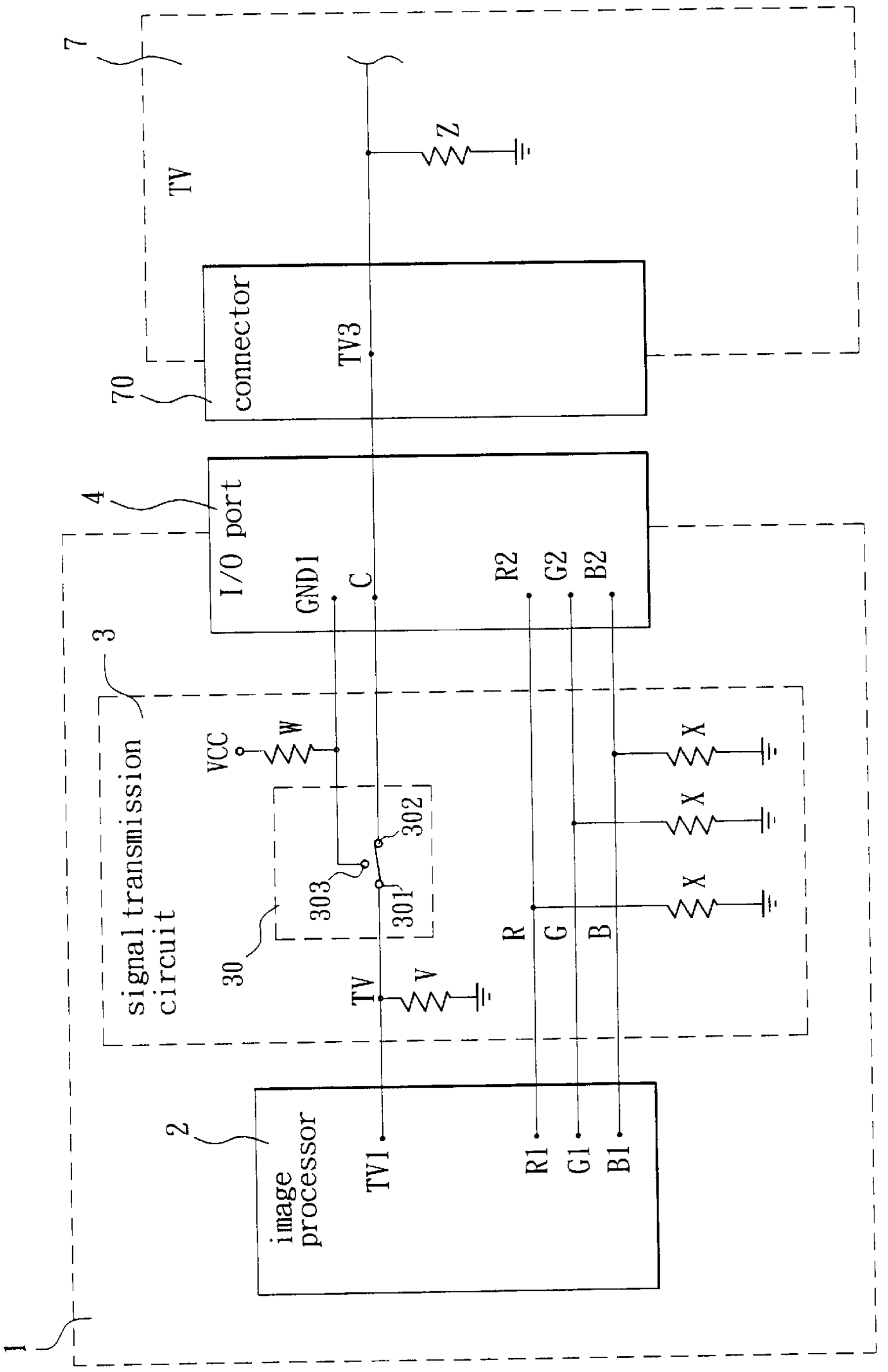
FIG. 6 is similar to FIG. 4 showing a variation of FIG. 4 embodiment.

Referring to FIGS. 5 and 6, two variations of FIGS. 3 and 4 embodiments are shown wherein an analog switch 30 comprises a first pin 301 coupled to composite signal contact TV1 of image processor 2, a second pin 302 coupled to an open contact C of I/O port 4, and a third pin 303 serially coupled to ground contact GND1 of I/O port 4 and a pull-up resistor W. Further, one end of composite signal line TV is coupled to a selected resistor V having a predetermined resistance which is in turn connected to ground.

In FIG. 5, I/O port 4 is connectable to a connector 60 of monitor 6. Connector 60 of monitor 6 comprises a ground pin GND2 and red video signal pin R3, green video signal pin G3, and blue video signal pin B3 coupled to red video signal contact R2, green video signal contact G2, and blue video signal contact B2 of I/O port 4 respectively. Each of pins R3, G3, and B3 is coupled to a selected resistor Y having a predetermined resistance. When monitor 6 is connected to a computer 1, image processor 2 performs the following steps:

First, resistors Y of red video signal pin R3, green video signal pin G3, and blue video signal pin B3 and resistors X of red video signal line R, green video signal line G, and blue video signal line B are connected in parallel to form a resistor having a smaller resistance. Also, ground pin GND2 is connected to ground pin GND1. Next, image processor 2 continuously output a constant current. Hence, image processor 2 may detect that there is a change of signal voltage in each of red video signal line R, green video signal line G, and blue video signal line B (e.g., small voltage change). Further, analog switch 30 is in a low voltage level (i.e., disabled). Hence, first pin 301 is coupled to third pin 303. As a result, composite signal line TV is in an open state. Since there is a change of signal voltage in each of red video signal line R, green video signal line G, and blue video signal line B and first pin 301 is coupled to third pin 303, signal output is disabled in composite signal contact TV1. Also, composite signal line TV is in a high impedance state. Hence, red video signal contact R1, green video signal contact G1, blue video signal contact B1 may output signal to the connected monitor 6 via red video signal line R, green video signal line G, blue video signal line B and I/O port 4.

In FIG. 6, I/O port 4 is connectable to a connector 70 of TV 7. Connector 70 of TV 7 comprises a composite signal pin TV3 coupled to a pin C of I/O port 4. When connector 70 of TV 7 is connected to I/O port 4, image processor 2 performs the following steps:

First, resistors Z and V are connected in parallel to form a resistor having a smaller resistance. Next, image processor 2 continuously output a constant current. Hence, image processor 2 may detect that there is no change of signal voltage in each of red video signal line R, green video signal line G, and blue video signal line B. Further, analog switch 30 is in a high voltage level (i.e., enabled). Hence, first pin 301 is coupled to second pin 302. As a result, composite signal line TV is in a closed state. Since there is no change of signal voltage in each of red video signal line R, green video signal line G, and blue video signal line B, switch 30 is enabled, and first pin 301 is coupled to second pin 302, signal output is disabled in red video signal contact R1, green video signal contact G1, and blue video signal contact B1. Also, each of red video signal line R, green video signal line G, and blue video signal line B is in a high impedance state. Hence, composite signal contact TV1 may output signal to TV 7 via the connected I/O port 4.

Figure 7:
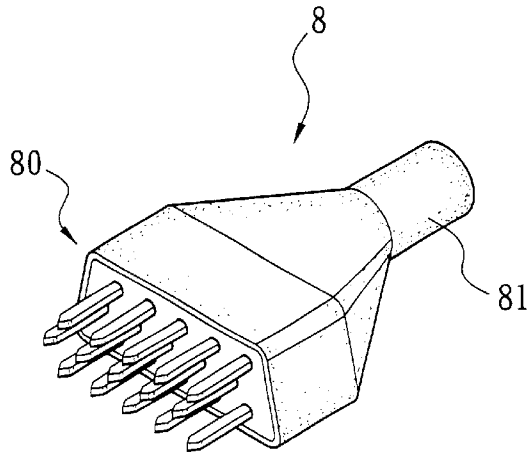
FIG. 7 is s perspective view of a first configuration of adapter according to the invention.
Figure 8:
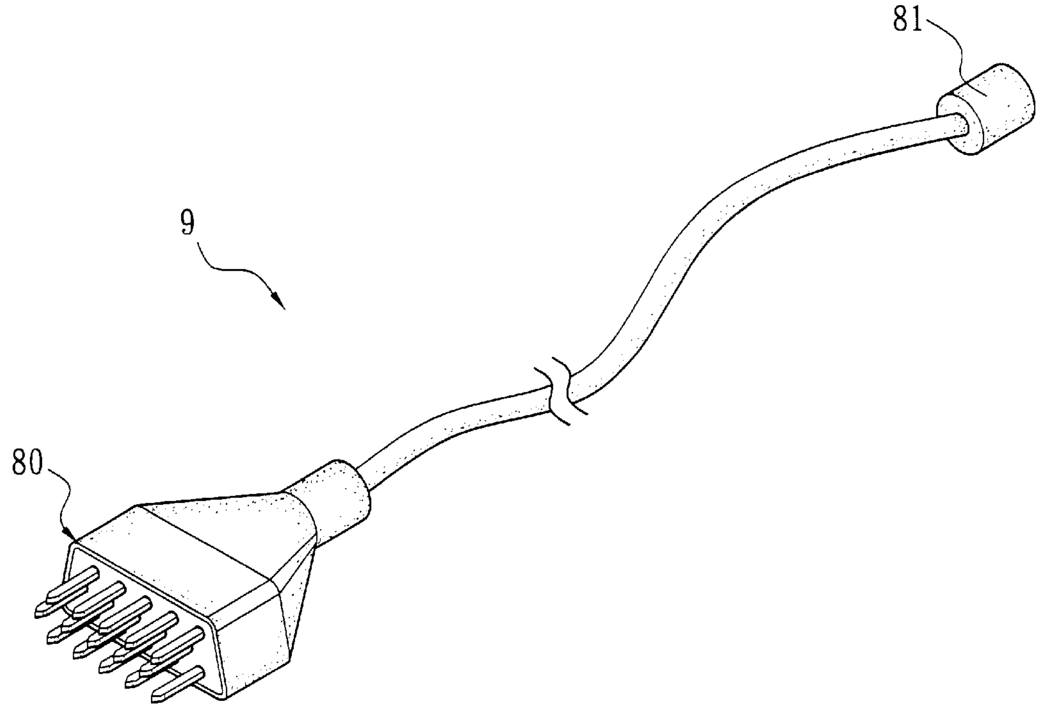
FIG. 8 is s perspective view of a second configuration of adapter according to the invention.

There is only one I/O port 4 formed on the case of notebook computer in the invention. Hence, it is inconvenient in use by customizing I/O port 4 as one that is connectable to either monitor 6 or TV 7 always as experienced in prior art. For solving above problem (i.e., enabling connector of monitor 6 or TV 7 to be capable of connecting to I/O port 4 as needed), as referring to FIG. 7, in the invention an adapter 8 is coupled to between I/O port 4 and connector of TV 7 (or monitor 6). One end of adapter 8 is customized as connector 80 coupled to I/O port 4 and the other end thereof is customized as connector 81 coupled to connector 70 of TV 7 (or connector 60 or monitor 6). This can effect the object of providing a single I/O port 4 on notebook computer 1 capable of connecting to monitor 6 or TV 7 as needed. Referring to FIG. 8, a second configuration of adapter 8 according to the invention is shown wherein a cable 9 is provided for interconnecting connectors 80 and 81 of adapter 8.

While the invention has been described by means of specific embodiments, numerous modifications and variations could be made thereto by those skilled in the art without departing from the scope and spirit of the invention set forth in the claims.

What is claimed is:

1. An input/output (I/O) port assembly of a notebook computer connectable to monitor or a television (TV) as needed, the I/O port assembly comprising:

an image processor provided in the computer and including a composite signal contact, a red video signal contact, a green video signal contact, and a blue video signal contact;

an I/O port provided on a case of the computer and including a red video signal contact, a green video signal contact, and a blue video signal contact; and a signal transmission circuit interconnected between the image processor and the I/O port and including a composite signal line, a red video signal line, a green video signal line, and a blue video signal line wherein one ends of the red, the green, and the blue video signal lines are coupled to the red, the green, and the blue video signal contacts of the image processor respectively and the other ends thereof are coupled to the red, the green, and the blue video signal contacts of the I/O port respectively, each of the red, the green, and the blue video signal lines is coupled to a first resistor having a predetermined resistance which is in turn connected to ground, and one end of the composite signal line is coupled to the composite signal contact and the other end thereof is coupled to one of the red, the green, and the blue video signal lines.

2. The I/O port assembly of claim 1, wherein the I/O port is connectable to a connector of the monitor which includes a red video signal pin, a green video signal pin, and a blue video signal pin coupled to the red, the green, and the blue video signal contacts of the I/O port respectively wherein each of the red, the green, and the blue video signal pins is coupled to a second resistor having a predetermined resistance.

3. The I/O port assembly of claim 1, wherein the I/O port is connectable to a connector of the TV which includes a composite signal pin coupled to the composite signal contact connected to the composite signal line.

4. The I/O port assembly of claim 1, further comprising an adapter coupled to between the I/O port and the connector of the TV, the adapter having a first connector at one end coupled to the I/O port and a second connector at the other end coupled to the connector of the monitor.

5. The I/O port assembly of claim 4, further comprising a cable interconnected between the first and the second connectors of the adapter.

6. An input/output (I/O) port assembly of a notebook computer connectable to a monitor or a television (TV) as needed, the I/O port assembly comprising:

an image processor in the computer and including a composite signal contact, a red video signal contact, a green video signal contact, and a blue video signal contact;

an I/O port on a case of the computer and including a red video signal contact, a green video signal contact, a blue video signal contact, an open contact, and a ground contact;

a signal transmission circuit interconnected between the image processor and the I/O port and including a composite signal line, a red video signal line, a green video signal line, and a blue video signal line wherein one ends of the red, the green, and the blue video signal lines are coupled to the red, the green, and the blue video signal contacts of the image processor respectively and the other ends thereof are coupled to the red, the green, and the blue video signal contacts of the I/O port respectively, each of the red, the green, and the blue video signal lines and the composite signal line is coupled to a third resistor having a predetermined resistance which is in turn connected to ground; and an analog switch on the composite signal line and including a first pin coupled to the composite signal contact of the image processor, a second pin coupled to the open contact, and a third pin serially coupled to the ground contact of the I/O port and a pull-up resistor.

7. The I/O port assembly of claim 6, wherein the port is connectable to a connector of the monitor which includes a ground contact, a red video signal pin, a green video signal pin, and a blue video signal pin wherein each of the red, the green, and the blue video signal pins is coupled to the red, the green, and the blue video signal contacts of the I/O port respectively, and each of the red, the green, and the blue video signal pins is coupled to a fourth resistor having a predetermined resistance.

8. The I/O port assembly of claim 6, wherein the I/O port is connectable to a connector of the TV which includes a pin coupled to the open contact of the I/O port.

9. The I/O port assembly of claim 6, further comprising an adapter coupled to between the I/O port and the connector of the TV, the adapter having a first connector at one end coupled to the I/O port and a second connector at the other end coupled to the connector of the monitor.

10. The I/O port assembly of claim 9, further comprising a cable interconnected between the first and the second connectors of the adapter.

* * * * *